United States Patent
Becker

(10) Patent No.: US 10,014,914 B1
(45) Date of Patent: Jul. 3, 2018

(54) ADAPTIVE INTERFERENCE CANCELLER FOR MULTIPLE REFERENCE INPUTS

(71) Applicant: Neal David Becker, Frederick, MD (US)

(72) Inventor: Neal David Becker, Frederick, MD (US)

(73) Assignee: Hughes Network Systems, L.L.C., Germantown, MD (US)

( * ) Notice: Subject to any disclaimer, the term of this patent is extended or adjusted under 35 U.S.C. 154(b) by 0 days.

(21) Appl. No.: 15/621,253

(22) Filed: Jun. 13, 2017

(51) Int. Cl.

| | |
|---|---|
| H04B 1/10 | (2006.01) |
| H04B 7/0404 | (2017.01) |
| H04L 27/34 | (2006.01) |
| H04B 7/02 | (2018.01) |
| H04B 7/00 | (2006.01) |
| H04L 5/14 | (2006.01) |
| H04B 1/525 | (2015.01) |

(52) U.S. Cl.
CPC .......... *H04B 7/0404* (2013.01); *H04L 27/34* (2013.01); *H04B 1/525* (2013.01); *H04B 7/002* (2013.01); *H04B 7/02* (2013.01); *H04L 5/14* (2013.01)

(58) Field of Classification Search
CPC ............. H04B 1/10; H04B 1/12; H04B 1/126
See application file for complete search history.

(56) References Cited

U.S. PATENT DOCUMENTS

| | | | | |
|---|---|---|---|---|
| 7,010,277 B1* | 3/2006 | Andre | .................... | H04B 1/123 |
| | | | | 455/63.1 |
| 7,406,140 B2* | 7/2008 | Kunieda | .................. | H04B 3/23 |
| | | | | 375/232 |
| 8,428,542 B2* | 4/2013 | Bornazyan | ........... | H04B 1/1081 |
| | | | | 455/278.1 |
| 2007/0066226 A1* | 3/2007 | Cleveland | ................ | H04B 1/00 |
| | | | | 455/63.1 |

OTHER PUBLICATIONS

"Adaptive Filter Theory", chapter 5, Prentice Hall, 4th edition, 2002.

(Continued)

*Primary Examiner* — Blane Jackson
(74) *Attorney, Agent, or Firm* — Capitol City TechLaw; Jasbir Singh

(57) ABSTRACT

An interference canceller and a method for canceling interference are disclosed. The interference canceller includes: a subtractor to receive a primary signal including a desired signal and multiple interferers and to generate an output signal including the desired signal; a plurality of Finite Impulse Response (FIR) filters, wherein each FIR filter receives a reference signal from a plurality of reference signals and outputs a filtered reference signal; and a plurality of loop filters, wherein each loop filter outputs coefficients. In the interference canceller, each of the reference signals includes signals from a subset of the multiple interferers, each loop filter corresponds to one of the FIR filters and receives the corresponding reference signal, each loop filter receives the output signal, the output coefficients of each loop filter are based on the output signal and the correspond- (Continued)

ing reference signal, the output coefficients adaptively adjust the filtered reference signal of the corresponding FIR filter, and the subtractor subtracts each of the filtered reference signals from the primary signal to generate the output signal.

18 Claims, 3 Drawing Sheets

(56) References Cited

OTHER PUBLICATIONS

B. Widrow et al.. "Adaptive Noise Cancelling: Principles and Applications", Proceedings of the IEEE, 63(12), Dec. 1975.
R. Bradley et al., "An adaptive interference canceling receiver for radio astronomy—theory," Technical report, National Radio Astronomy Observatory, Nov. 1, 1996. Electronics Division Internal Report #305.

* cited by examiner

ADAPTIVE INTERFERENCE CANCELLER FOR MULTIPLE REFERENCE INPUTS

FIELD

The present teachings disclose a method and a system to cancel multiple interferers with multiple reference antennas using an adaptive technique such as Least Mean Square (LMS).

BACKGROUND

A receiver may receive a desired (primary) signal contaminated by one or more interfering signals and possibly by noise, for example, with a high-gain, usually directional, antenna. For example, a desired satellite signal and multiple interferer signals can be received by a gateway receiver for a satellite network. The multiple interferer signals may be caused by the receiver, for example, receiving terrestrial interference. The multiple interferer signals can be canceled from the desired signal by use of a primary antenna and multiple reference antennas (usually low-gain antennas).

In the conventional art, when multiple interfering sources (I) are present, then multiple reference antennas (Nr) where Nr>=I are used to provide an interference canceller. However, in the prior art, complicated matrix-based solutions are required when there are multiple interferers and multiple reference antennas. Although the prior art discloses use of a Least Mean Squared (LMS) process as an interference canceller, the prior art discloses using LMS only when there is a single interfering source, as opposed multiple interfering sources, are present.

FIG. 1 illustrates a single reference LMS interference canceller of the prior art.

An LMS interference canceller 100 includes a multi-tap Finite Impulse Response (FIR) filter h that uses complex coefficients, a subtractor 102, a multiplier 104 and a coefficient updater 106. A primary received signal y1 and a reference antenna input y2 are provided to the LMS interference canceller 100 to produce an output signal out. The primary received signal y1 includes a desired signal and interferers. The reference antenna input y2 may include interferers, for example, background noise, terrestrial noise, a signal from an undesired transmission, or the like. The FIR filter h is adaptively adjusted by the LMS canceller 100. The signal model of the received signals is given as:

$$y1 = \alpha_1 P + \beta_1 I$$

$$y2 = \alpha_2 P + \beta_2 I$$

where y1 and y2 are signals from the primary and reference antennas, respectively; P and I are the primary and interfering signals, respectively, and $\alpha_i$ and $\beta_i$ are some complex coefficients that capture the signal gains between the signal sources and the antennas. In general, there may also be some path delay difference between the signals received at the antennas (not shown), which delay is adjusted for by allowing for a multi-tap FIR filter h to cover the delay differential.

The LMS canceller 100 operates by adjusting the tap weights with the coefficient updater 106 (usually complex coefficients) of h to decorrelate the output signal out from the reference antenna input y2 to the filter h (here y2). The subtractor 102 subtracts the output (the filtered reference signal) of the FIR filter h from the primary reference signal y1 to generate the output signal out. Thus, in the prior art, the filter h is adjusted so that the output signal out is uncorrelated with the interference received over y2. For the LMS canceller 100 to work well, 1) the reference antenna input signal y2 contains a sample of an interferer (not shown) with a high signal-to-noise ratio, and 2) the reference antenna input y2 also contains very little of the primary received signal y1. The LMS canceller 100 is in the prior art of FIG. 1. The adaptation of the coefficients of the filter h may be described as:

$$H_{n+1} = H_n + 2\mu o_n{}^* X_n \qquad [1]$$

where $H_n$ is the vector of tap values of the filter h at time n, $X_n$ is the vector of input values to the filter h at time n, $o_n$ is the output (residual) signal, $\mu$ is an adaptation speed constant, and $\{*\}$ denotes a complex conjugate.

The prior art only disclosed a matrix arithmetic formulation for suppressing interference from multiple sources or reference antennas. The present teachings are computationally simpler, and are easier to implement using inexpensive digital hardware, for example, a Field Programmable Gate Array (FPGA) or the like. Moreover, for multiple reference antennas, the prior art also disclosed cascading (serializing) output of single reference input LMS cancellers to successively attempt to cancel signals from each reference from the primary received signal y1, but this technique is not generally effective. In contrast to this serial cancellation, the present teachings jointly cancel the multiple reference inputs in parallel and are effective.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present disclosure teaches a system and a method to cancel multiple interferers with multiple reference antennas using only simple adaptive techniques such as a Least Mean Square (LMS) canceller.

An interference canceller is disclosed. The interference canceller includes: a subtractor to receive a primary signal including a desired signal and multiple interferers and to generate an output signal including the desired signal; a plurality of Finite Impulse Response (FIR) filters, wherein each FIR filter receives a reference signal from a plurality of reference signals and outputs a filtered reference signal; and a plurality of loop filters, wherein each loop filter outputs coefficients. In the interference canceller, each of the reference signals includes signals from a subset of the multiple interferers, each loop filter corresponds to one of the FIR filters and receives the corresponding reference signal, each loop filter receives the output signal, the output coefficients of each loop filter are based on the output signal and the corresponding reference signal, the output coefficients adaptively adjust the filtered reference signal of the corresponding FIR filter, and the subtractor subtracts each of the filtered reference signals from the primary signal to generate the output signal.

A method for canceling interference is disclosed. The method includes: receiving a primary signal including a desired signal and multiple interferers; receiving a plurality of reference signals; filtering each of the plurality of reference signals with a corresponding Finite Impulse Response (FIR) filter, wherein each FIR filter outputs a filtered reference signal; subtracting each of the filtered reference signals from the primary signal to generate an output signal including the desired signal; and generating output coefficients for each FIR filter using a corresponding loop filter. In the method, each of the reference signals includes signals from a subset of the multiple interferers, the output coefficients generated by each loop filter are based on the output signal and the corresponding reference signal, and the output coefficients adaptively adjust the filtered reference signal of the corresponding FIR filter.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

Figure 1:
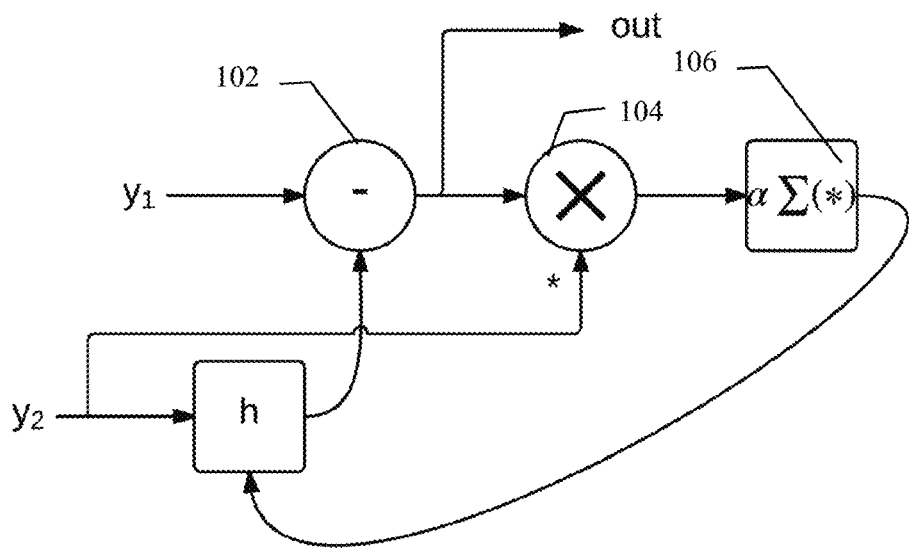
FIG. 1 illustrates a single reference LMS interference canceller of the prior art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present disclosure teaches a system and a method to cancel multiple interferers with multiple reference antennas using only simple adaptive techniques such as a Least Mean Square (LMS) canceller.

Figure 2:
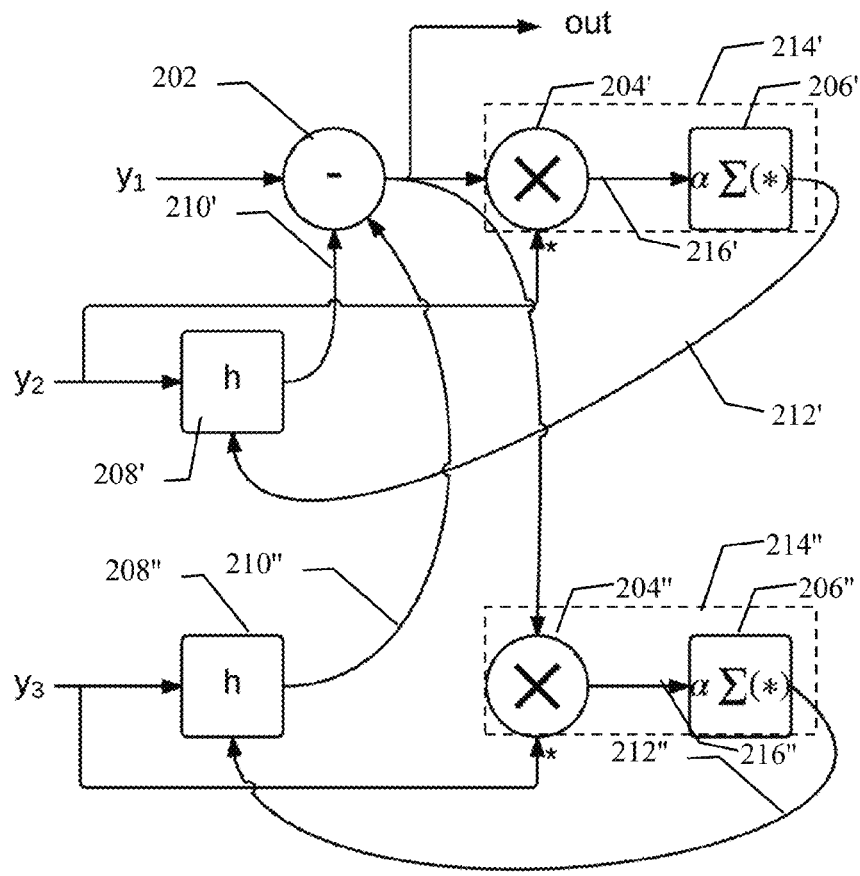
FIG. 2 illustrates a multiple reference interference canceller according to various embodiments.

FIG. 2 illustrates a multiple reference interference canceller according to various embodiments.

FIG. 2 illustrates an embodiment of a multiple reference interference canceller 200 that support two reference inputs, namely y2 and y3, and a primary input y1. The primary input y1 includes a desired signal and interferers. The reference antenna inputs y2 and y3 may include interferers, for example, background noise, terrestrial noise, a signal from an undesired transmission, or the like. In exemplary embodiments, the number of reference inputs can be two or more. When multiple interferers are present, the single reference LMS canceller 100 of FIG. 1 cannot in general completely cancel signals from the multiple interferers. The multiple reference interference canceller 200 may be modeled as:

$$y1 = \alpha_1 P + \beta_1 I_1 + \gamma_1 I_2$$

$$y2 = \alpha_2 P + \beta_2 I_1 + \gamma_2 I_2$$

$$y3 = \alpha_3 P + \beta_3 I_1 + \gamma_3 I_2$$

where $I_1$ and $I_2$ are two (2) different interfering sources that appear at the three (3) antennas, each with different complex channel gains.

The multiple reference interference canceller 200 may include multiple multi-tap Finite Impulse Response (FIR) filters h and multiple coefficient updaters. In exemplary embodiments, one of the coefficient updaters may be included in a loop filter. In exemplary embodiments, the coefficient updaters may update the coefficients using the LMS process or technique. In some embodiments, the coefficient updaters may adaptively adjust the coefficients using the LMS technique. In some embodiments, the coefficient updaters may adaptively adjust the coefficients using a Recursive Least Square (RLS) technique or process. A primary received signal y1, and multiple reference antenna inputs y2 and y3 are provided to the multiple reference interference canceller 200 to produce an output signal labeled out. Each FIR filter in the multiple reference interference canceller 200 is connected to a loop filter. Each loop filter includes a multiplier and a coefficient updater. Input for the multiplier includes the output signal out and the input/reference signal provided to the corresponding FIR filter. Input for the coefficient updater includes an output of the multiplier. An output of the coefficient multiplier is looped back to the FIR filter.

For example, the reference signal y2 may be input to a FIR filter 208' and a multiplier 204'. An output 216' of the multiplier 204' is provided to a coefficient updater 206' to determine the complex coefficients 212'. The coefficients 212' are fed or looped back to the FIR filter 208' to adaptively adjust the FIR filter 208'. The multiplier 204' and the coefficient updater 206' may form a loop filter 214'. Similarly, the reference signal y3 may be input to a FIR filter 208" and a multiplier 204". An output 216" of the multiplier 204" is provided to a coefficient updater 206" to determine the complex coefficients 212". The coefficients 212" are fed or looped back to the FIR filter 208" to adaptively adjust the FIR filter 208". The multiplier 204" and the coefficient updater 206" may form a loop filter 214". The coefficient updaters 206' and 206" may implement updates according to Equation 1.

The primary received signal y1, a filtered reference signal 210' from the FIR filter 208' and a filtered reference signal 210" from the FIR filter 208" are provided to a subtractor 202. The subtractor 202 subtracts or removes the filtered reference signals 210' and 210" from the primary received signal y1 to generate the output signal out. In exemplary embodiments, the output signal out eliminates the multiple interferers $I_1$ and $I_2$ from y1. The output signal out is also provided, fed or looped back to the multipliers 204' and 204" to adaptively adjust the FIR filters 208' and 208", respectively. As such, the multiple reference interference canceller 200 provides for subtracting each FIR filter's output from the primary received signal y1 in parallel (as compared to cascading an output of multiple FIR filters).

In exemplary embodiments, a wide variety of adaptive filter variations can be used besides LMS in the coefficient adaptation of the FIR filter. The filter variations offer a choice of complexity vs. performance. In exemplary embodiments, the adaptation of the FIR filter may include a Recursive Least Square (RLS) filter.

Random Interference Test Results

Figure 3:
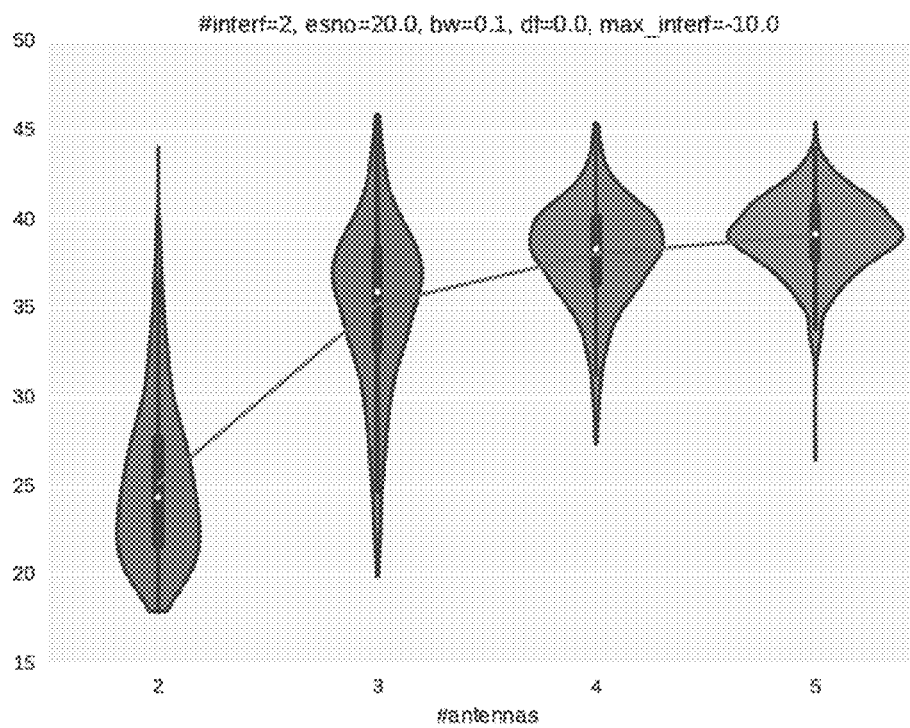
FIG. 3 illustrates a "box plot" of test results plotting a Mean Squared Error (MSE) versus a number of reference antennas when there are two interfering sources.

FIG. 3 illustrates a "box plot" of test results plotting a Mean Squared Error (MSE) versus a number of reference antennas when there are two interfering sources.

Figure 4:
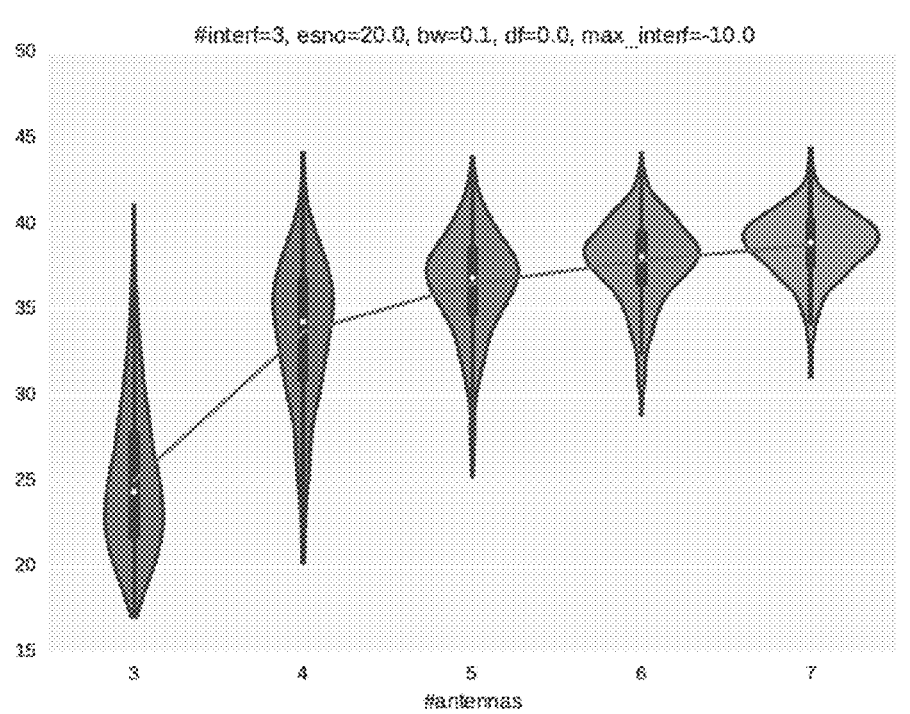
FIG. 4 illustrates a "box plot" of test results plotting a Mean Squared Error (MSE) versus a number of reference antennas when there are three interfering sources.

FIG. 4 illustrates a "box plot" of test results plotting a Mean Squared Error (MSE) versus a number of reference antennas when there are three interfering sources.

In the tests, interference matrices were chosen randomly and statistical analysis was performed on the resulting Mean Squared Error (MSE). Coupling from each interference source into the desired output signal is randomly chosen according to a distribution UC(max_interf) where the notation UC(r) means a uniform circularly-symmetric complex distribution on a radius r. Coupling of each interference source into each reference (omni) antenna is UC(1). Coupling of the desired signal into the main antenna is set to 1. Coupling of the desired signal into reference antennas is set to 0. The multipliers compute the correlation of the interferers and feed it back to the FIR filter.

All random values are chosen independently. This random interference test result is probably a pessimistic assumption. In some cases, there may be a strong interference into the desired output signal, but only a weak signal at the reference antenna. A more realistic simulation would use stochastic geometry and realistic propagation models.

All interferers are at the same frequency. This is again a pessimistic assumption. Because the multi-tap cancellers can produce a selective frequency response, and the non-overlapping interferers can only give better results than the results presented here. In the test results, the parameters are:
  #interf: Number of interferers
  esno: Noise density level (dB) on the interferer antenna relative to an interferer if the interferers level was set to 1
  bw: bandwidth of interferer relative to the desired signal
  df: frequency offset of each interferer (as a worst-case test, these tests all have df=0)
  max_interf: maximum level of interference into the main signal (dB)

FIG. 3 and FIG. 4 show the mean-squared-error (MSE) due to interference into the primary signal that results from Monte-Carlo tests where random matrixes are chosen representing the coupling between the primary and interference sources and the antennas. Each of the "box plots" illustrates the statistical distribution of MSE values resulting from the test of a set of randomly chosen matrixes. In FIG. 3 and FIG. 4, the horizontal axis represents the number of reference antennas, while the vertical axis represents the negative MSE in decibels (dB). As illustrated by the "box plots" in FIG. 3 and FIG. 4, The negative MSE increases (i.e., as the negative of the MSE is illustrated, higher values of the negative MSE indicate a more robust desired signal) as the number of antennas increases and more of the signal concentrates around the median of each particular "box plot" for the number of reference antennas being used. The increase in the signal concentration is illustrated by the bubble about the negative MSE median in the box plot.

Figure 5:
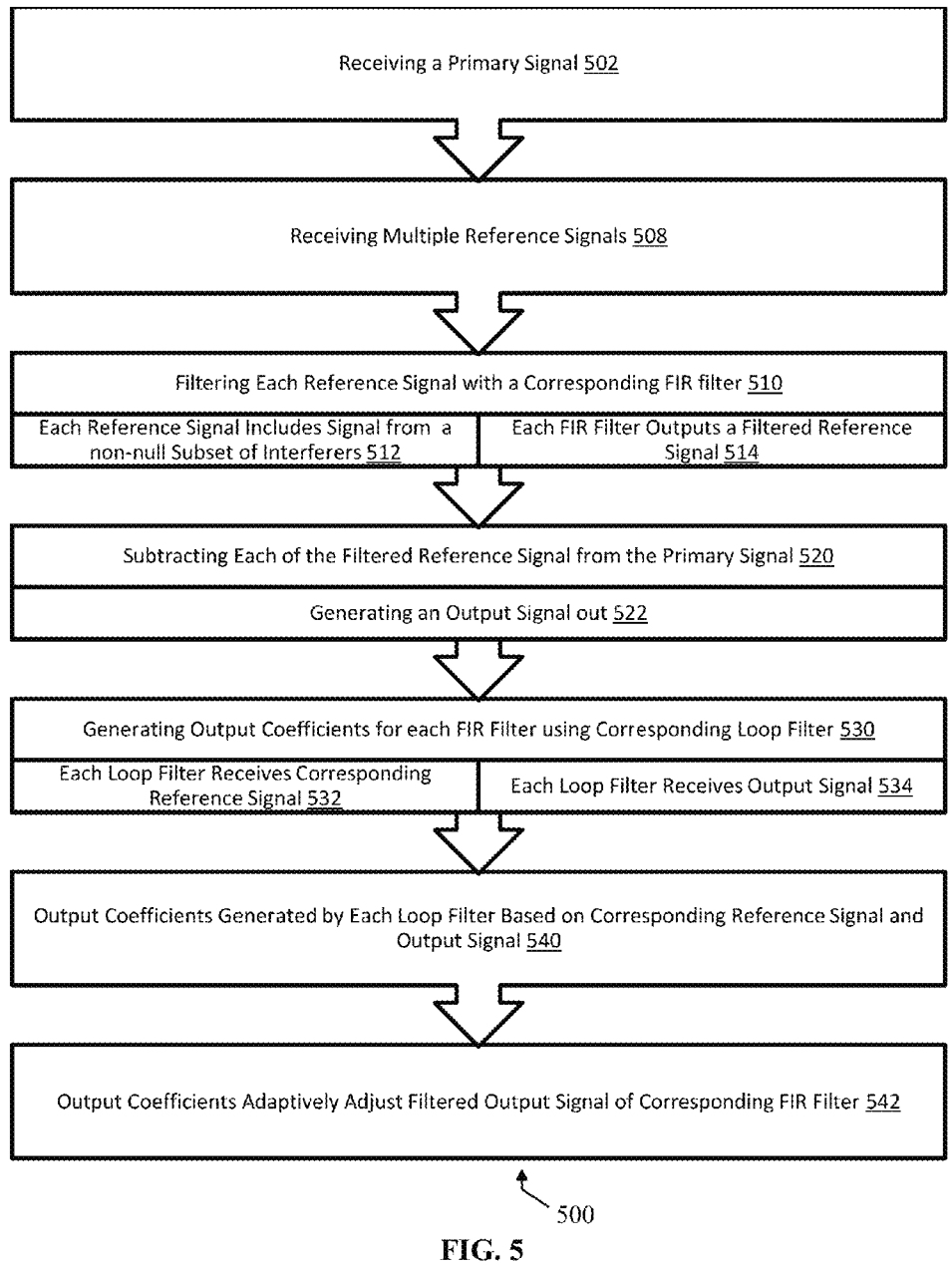
FIG. 5 illustrates a flowchart of an exemplary method for canceling interference according to various embodiments.

FIG. 5 illustrates a flowchart of an exemplary method for canceling interference according to various embodiments.

In exemplary embodiments, the method 500 includes operation 502 for receiving a primary signal. The primary signal includes a desired signal and signals from interferers. The method 500 may include operation 508 for receiving multiple reference signals. The method 500 may include operation 510 for filtering each reference signal with a corresponding FIR filter 510. The method 500 may include operation 512 where each reference signal includes signals from a subset of the multiple interferers. When the subset of the multiple interferers is a void set (no interference), the method 500 may correctly generate a filtered reference signal that does almost nothing to the primary signal at operation 520 for subtracting (see below). In some embodiments, the subset of the multiple interferers may a non-void subset of the multiple interferers. The method 500 may include operation 514 where each FIR filter outputs a filtered reference signal 514. The method 500 may include operation 520 for subtracting each of the filtered reference signals from the primary signal. The method 500 may include operation 522 for generating an output signal out.

The method 500 may include operation 530 for generating output coefficients for each FIR filter using corresponding loop filter. The method 500 may include operation 532 where each loop filter receives the corresponding reference signal. The method 500 may include operation 534 where each loop filter receives the output signal. The method 500 may include operation 540 where the output coefficients generated by each loop filter are based on the corresponding reference signal and the output signal. The method 500 may include operation 542 where the output coefficients adaptively adjust the filtered output signal of corresponding FIR filter, Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. An interference canceller comprising:
  a subtractor to receive a primary signal comprising a desired signal and multiple interferers and to generate an output signal comprising the desired signal;

a plurality of Finite Impulse Response (FIR) filters, wherein each FIR filter receives a reference signal from a plurality of reference signals and outputs a filtered reference signal; and a plurality of loop filters, wherein each loop filter outputs coefficients, wherein each of the reference signals comprises signals from a subset of the multiple interferers, each loop filter corresponds to one of the FIR filters and receives the corresponding reference signal, each loop filter receives the output signal, the output coefficients of each loop filter are based on the output signal and the corresponding reference signal, the output coefficients adaptively adjust the filtered reference signal of the corresponding FIR filter, and the subtractor subtracts each of the filtered reference signals from the primary signal to generate the output signal.

2. The interference canceller of claim 1, wherein each of the FIR filters and the corresponding output coefficients adjust for a path delay difference between the reference signals.

3. The interference canceller of claim 1, wherein each loop filter comprises a coefficient updater to adaptively adjust the coefficients based on the output signal and the corresponding reference signal.

4. The interference canceller of claim 1, wherein each loop filter comprises a coefficient updater to adaptively adjust the coefficients using a Least Mean Squared (LMS) process.

5. The interference canceller of claim 1, wherein each loop filter comprises a coefficient updater to adaptively adjust the coefficients using a Recursive Least Squares (RLS) process.

6. The interference canceller of claim 1, wherein a count of the multiple interferers is less than a count of the plurality of FIR filters.

7. The interference canceller of claim 1, wherein at least one of the reference signals is generated by an omnidirectional antenna.

8. The interference canceller of claim 1, wherein at least one of the reference signals is generated by a directional antenna.

9. The interference canceller of claim 1, wherein at least one of the multiple interferers comprises a frequency range overlapping with a frequency range of the desired signal.

10. A method for canceling interference, the method comprising:

receiving a primary signal comprising a desired signal and multiple interferers;

receiving a plurality of reference signals;

filtering each of the plurality of reference signals with a corresponding Finite Impulse Response (FIR) filter, wherein each FIR filter outputs a filtered reference signal;

subtracting each of the filtered reference signals from the primary signal to generate an output signal comprising the desired signal; and generating output coefficients for each FIR filter using a corresponding loop filter, wherein each of the reference signals comprises signals from a subset of the multiple interferers, the output coefficients generated by each loop filter are based on the output signal and the corresponding reference signal, and the output coefficients adaptively adjust the filtered reference signal of the corresponding FIR filter.

11. The method of claim 10, wherein each of the FIR filters and the corresponding output coefficients adjust for a path delay difference between the reference signals.

12. The method of claim 10, wherein each loop filter adaptively adjusts the coefficients based on the output signal and the corresponding reference signal.

13. The method of claim 10, wherein each loop filter comprises a coefficient updater to adaptively adjust the coefficients using a Least Mean Squared (LMS) process.

14. The method of claim 10, wherein each loop filter comprises a coefficient updater to adaptively adjust the coefficients using a Recursive Least Squares (RLS) process.

15. The method of claim 10, wherein a count of the multiple interferers is less than a count of the FIR filters.

16. The method of claim 10, wherein at least one of the reference signals is generated by an omnidirectional antenna.

17. The method of claim 10, wherein at least one of the reference signals is generated by a directional antenna.

18. The method of claim 10, wherein at least one of the multiple interferers comprises a frequency range overlapping with a frequency range of the desired signal.

* * * * *